US007148905B2

(12) United States Patent
Hong et al.

(10) Patent No.: US 7,148,905 B2
(45) Date of Patent: Dec. 12, 2006

(54) SYSTEMS AND METHOD FOR ANNOTATING PAGES IN A THREE-DIMENSIONAL ELECTRONIC DOCUMENT

(75) Inventors: Lichan Hong, Mountain View, CA (US); Stuart K. Card, Los Altos Hills, CA (US); Jock D. Mackinlay, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 261 days.

(21) Appl. No.: 10/739,213

(22) Filed: Dec. 19, 2003

(65) Prior Publication Data
US 2005/0134606 A1 Jun. 23, 2005

(51) Int. Cl.
G09G 5/00 (2006.01)
G06F 15/00 (2006.01)
G06K 9/36 (2006.01)

(52) U.S. Cl. .................. 345/629; 715/512; 382/285
(58) Field of Classification Search ........... 345/629; 715/512; 382/285
See application file for complete search history.

(56) References Cited

U.S. PATENT DOCUMENTS

| 5,146,552 | A  | * | 9/1992 | Cassorla et al. ......... 715/512 |
| 5,710,878 | A  | * | 1/1998 | McCoy et al. ........... 345/581 |
| 5,960,448 | A  | * | 9/1999 | Reichek et al. .......... 715/526 |
| 6,340,980 | B1 |   | 1/2002 | Ho |
| 6,584,479 | B1 | * | 6/2003 | Chang et al. ............ 715/512 |
| 6,859,909 | B1 | * | 2/2005 | Lerner et al. ........... 715/512 |
| 2002/0035697 | A1 |   | 3/2002 | McCurdy et al. |
| 2002/0113823 | A1 | * | 8/2002 | Card et al. ............. 345/776 |
| 2003/0013073 | A1 |   | 1/2003 | Duncan et al. |

FOREIGN PATENT DOCUMENTS

| EP | 0 822 501 A2   | 2/1998 |
| WO | WO 97/22109    | 6/1997 |
| WO | WO 01/42980 A1 | 6/2001 |
| WO | WO 02/01339 A1 | 1/2002 |

OTHER PUBLICATIONS

Special Edition Using Microsoft Word 2000, Que Corporation, 1999, pp. 16-17, 71-76, 853-859.*
D. Bargeron, T. Moscovish, "Techniques for on-screen shapes, text and handwriting: Reflowing Digital Ink Annotations," Proceedings of the SIGHI Conference on Human Factors in Computing Systems, ACM Press, vol. 5, No. 1, Apr. 2003, pp. 385-392.*
M.N. Price, B.N. Schilit, G. Golovchinsky, "Xlibris: The Active Reading Machine," Conference Summary on Human Factors in Computing, ACM Press, Apr. 1998, pp. 22-23.*
Zinio.com—Same Magazines. New Experience; http://web.archive.ord/web/20020527231503/http://www.zinio.com/ Dec. 22, 2003, 2 pages.

(Continued)

Primary Examiner—Kee M. Tung
Assistant Examiner—Michelle K. Lay
(74) Attorney, Agent, or Firm—Oliff & Berridge, PLC

(57) ABSTRACT

A system and method for annotating three-dimensional electronic documents. A user specifies, on a two-dimensional screen, a portion of a page of a three-dimensional document as a specific page area to be annotated. The annotation is displayed to the user with the transparent polygon technique, the vertex coloring technique and/or the texture coloring technique. These display techniques support highlighting annotations, free-form annotations, and text annotations.

17 Claims, 10 Drawing Sheets

OTHER PUBLICATIONS

Pat Hanrahan & Paul Haeberli, "Direct WYSIWYG Painting and Texturing on 3D Shapes," Aug. 1990, Computer Graphics, vol. 24, No. 4, pp. 215-223.

Catherine C. Marshall, "Annotation: from paper books to the digital library" 10 pages 1997 Proc. of ACM Digital Library '97 Conf.

Bill N. Schilit, Gene Golovchinsky, Morgan N. Price, "Beyond Paper: Supporting Active Reading with Free Form Digital Ink Annotations." To appear in Proceedings of CHI 98, pp. 1-8.

Bill N. Schilit, Morgan N. Price, Gene Golovchinsky, "Digital Library Information Appliances" In Proceedings of Digital Libraries '98—Third ACM Conference on Digital Libraries, Pittsburgh, PA, Jun. 23-26, 1998, 10 pgs.

Beverly L. Harrison, "E-Books and the Future of Reading" IEEE Computer Graphics and Applications— May/Jun. 2000, pp. 32-39.

FlipBrowser; http://web.archive.org/web/20001018000231/www.flipbrowser.com/home.php Dec. 22, 2003.

U.S. Appl. No. 10/739,175, filed Dec. 2003, Hong et al.

* cited by examiner

SYSTEMS AND METHOD FOR ANNOTATING PAGES IN A THREE-DIMENSIONAL ELECTRONIC DOCUMENT

INCORPORATION BY REFERENCE

The entire disclosure of co-pending U.S. patent application 10/739175 is hereby incorporated by reference herein in its entire

BACKGROUND OF THE INVENTION

1. Field of Invention

This invention generally relates to systems and method for annotating three-dimensional electronic documents.

2. Description of Related Art

Page annotation of documents including books, magazines, journals, textbooks, photo albums, maps, periodicals, or the like, is a common technique performed by readers and viewers of these documents. The page annotation feature is highly desirable to the readers and the viewers because this feature provides the readers and the viewers with the ability to mark the documents with text notes, handwritten notes, bookmarks, highlights and/or the like.

Although many of these documents have been traditionally presented in paper format, electronic formats of these documents have become widely available due to numerous developments in the computer related fields, i.e. the Internet. With the increasing growth of electronic documents, the readers and the viewers still find the page annotation feature highly desirable. Therefore, some annotation tools for two-dimensional electronic documents have been provided.

For example, Schilit, Price, and Golovchinsky describes a research prototype called XLibris® used to display two-dimensional electronic document pages and support free-form annotations, which runs on a tablet computer and accepts pen input. By using the pen, the user can scribble notes, draw figures, and highlight text. The user also has the option of changing the color of the pen and/or selecting between a wide pen and a narrow pen.

PCT Patent WO0,142,980 describes an annotation tool for annotating two-dimensional electronic documents. PCT Patent WO0,142,980 describes that "the annotations are stored separately from the viewed document pages but are correlated with the pages such that when a previously annotated page is revisited, annotations related to that page are retrieved and displayed on top of the page as an 'ink' layer." By using the stylus, the user can highlight certain parts of the two-dimensional document in translucent colors or mark opaque annotations on the page, in a way very similar to XLibris. To display the annotations, the "pixel blending function blends pixels from a document page with corresponding pixels from an annotation or 'ink' layer mapped to that document page, and generates a blended pixel image that is displayed as an annotated document page."

PCT Patent No. WO0,201,339 also describes an annotation tool for annotating two-dimensional electronic documents. PCT Patent No. WO0,201,339 describes a technique which "analyzes the ink for each annotated pixel and renders the color and brightness of each pixel based on the original pixel color and the added annotation color so as to appear as physical ink would typically appear if similarly applied to physical paper."

Although using two-dimensional electronic annotation tools in three-dimensional electronic documents is conceivable, visualization and technical implementation problems result when the annotation tools created for the two-dimensional electronic documents are applied to three-dimensional electronic documents. Zinio Reader®, developed by Zinio Systems Inc., located at http://www.zinio.com and Adobe Acrobat® are two examples of annotation tools.

Adobe Acrobat® includes one example of a two-dimensional electronic annotation tool that allows selected portions of the electronic document to be highlighted. However, if the two-dimensional electronic highlighter annotation tool is applied to a three-dimensional electronic document, then difficulty in defining the highlight area and the visualization of the highlighting ink is presented.

For example, to capture and display pen-based annotations in three-dimensions is different from capturing and displaying pen-based annotations in two-dimensions. Specifically, in two-dimensions, translation of the user input from the computer screen to the page and updating the appearance of the page is relatively straightforward. On the other hand, in three-dimensions, three-dimensional transformations must be employed to determine where on the page the user wants to place an annotation and the three-dimensional parameters of the page must be modified in order to show the annotation in the rendered image. Therefore, it is desirable to create annotation tools specifically designed to annotate three-dimensional electronic documents. Although programs that alter three-dimensional objects exist, annotation tools to annotate three-dimensional electronic documents are limited.

For example, Hanrahan and Haeberli describe a three-dimensional electronic paint program that uses a technique to paint surfaces of three-dimensional electronic objects in "Direct WYSIWYG Painting and Texturing on 3D Shapes," Proceedings of the ACM SIGGRAPH'90 Conference, pages 215–223. Based on what is displayed on the computer screen, the user manipulates the parameters, i.e., diffuse color, specular color, and surface roughness, used to shade the surfaces of the three-dimensional object. The paint brush strokes specified by the user are transformed from the screen space to the texture space of the object to update the texture data. As a result, the appearance of the 3D surfaces is modified. Although the three-dimensional paint program paints surfaces of three-dimensional objects, the three-dimensional paint program is not an annotation tool used to annotate a three-dimensional electronic document.

SUMMARY OF THE DISCLOSURE

It would therefore be desirable to implement annotation tools in three-dimensional electronic documents that better represent annotation of actual physical, magazines, journals, textbooks, photo albums, maps, periodicals, or the like.

This invention provides systems and methods that allow pages of three-dimensional electronic documents to be annotated in a manner that more accurately represents annotating pages of an actual physical three-dimensional document.

This invention separately provides systems and methods that allow pages of three-dimensional electronic documents to be annotated without producing noticeable artifacts.

This invention separately provides systems and methods that provide a framework to support free-form annotations, text annotations and/or the like on one or more pages.

This invention separately provides systems and methods that allow the user to highlight a figure, a table, multiple lines of text and/or the like on one or more pages.

This invention separately provides systems and methods that allow the reader or viewer to specify a polygonal area as the highlighted area.

This invention separately provides systems and methods that transform the polygonal area from the coordinate system of the computer screen to the local coordinate system of the page (and if necessary, to the texture coordinate system of the page) and store the result as part of the highlight data.

This invention separately provides systems and methods that uses the highlight data to display the highlight on the page as the highlighted area is gradually defined and to recreate the highlight from the stored highlight data.

This invention separately provides systems and methods that allow the reader or viewer to introduce a transparent polygon.

This invention separately provides systems and methods that superimpose the transparent polygon over the page area which is to be highlighted.

This invention separately provides systems and methods that superimpose multiple transparent polygons over a common page area which is to be highlighted.

This invention separately provides systems and methods that re-evaluates the color of vertices as a function of vertex color, highlighter color and/or ink density.

This invention separately provides systems and methods that modify a texture pasted on the page geometry.

This invention separately provides systems and methods that generates a new page texture based on the original page texture, highlighter color and ink density.

This invention separately provides systems and methods that use texture of multiple resolutions to accelerate the modification of page texture in order to provide interactive responses to user input.

This invention separately provides systems and methods that provide three-dimensional annotations, i.e. Post-It® notes, that explicitly convey depth and/or a different shape than the underlying page.

In various exemplary embodiments of the systems and methods according to this invention, the areas of the pages of three-dimensional electronic documents to be annotated are specified.

In various exemplary embodiments of the systems and methods according to this invention, the reader or viewer can annotate more than one portion of a page and/or more than one page of the three-dimensional document without turning the page.

In various exemplary embodiments of the systems and methods according to this invention, the annotations of the three-dimensional electronic documents to be annotated are displayed without noticeable artifacts.

In various exemplary embodiments of the systems and methods according to this invention, the annotations are displayed using a transparent polygon technique that superimposes transparent polygon(s) over the page area that is to be highlighted.

In various exemplary embodiments of the systems and methods according to this invention, the annotations are displayed using a vertex coloring technique that colors the vertices within the three-dimensional electronic page area, which is to be highlighted.

In various exemplary embodiments of the systems and methods according to this invention, the annotations are displayed using a texture coloring technique that modifies the texture pasted on the electronic page geometry.

In various embodiments of the systems and methods according to this invention, the annotation tools for three-dimensional electronic documents simulate user interaction with actual physical three-dimensional documents by providing users with the ability to annotate the three-dimensional electronic documents in an intuitive manner. In various exemplary embodiments, there are several stages in producing an annotation. In various exemplary embodiments, the stages include, but are not limited to, the specifying stage and the displaying stage. In various exemplary embodiments, in the specifying stage, the user decides where to place an annotation and what annotation, i.e., a red highlight or a blue arrow, to place on the electronic document. In various exemplary embodiments, in the displaying stage, the annotation system displays the annotation in a visual format based on the data captured during the specifying stage.

In various exemplary embodiments of the systems and methods according to this invention, a virtual highlighter is used as an electronic annotation tool to annotate the three-dimensional electronic documents. In various exemplary embodiments, a user defines a page area of the three-dimensional electronic document to be highlighted in the specifying step. In various exemplary embodiments, the highlighting can be implemented in various ways. In various exemplary embodiments, these implementations include, but are not limited to, displaying the highlights with the transparent polygon, the vertex coloring, and the texture coloring techniques. In various exemplary embodiments, these annotation techniques may be modified in order to support other types of annotations, i.e., free-form annotations and text annotations.

In various exemplary embodiments of the systems and methods according to this invention, the annotations can be displayed on page texture of various resolutions.

In various exemplary embodiments of the systems and methods according to this invention, the annotations can be displayed in three dimensions to convey depth and/or a different shape than the underlying page.

These and other features and advantages of this invention are described in or are apparent from the following detailed description of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

The following detailed description illustrates one exemplary embodiment of the method for annotating pages of a three-dimensional electronic document.

Figure 1:
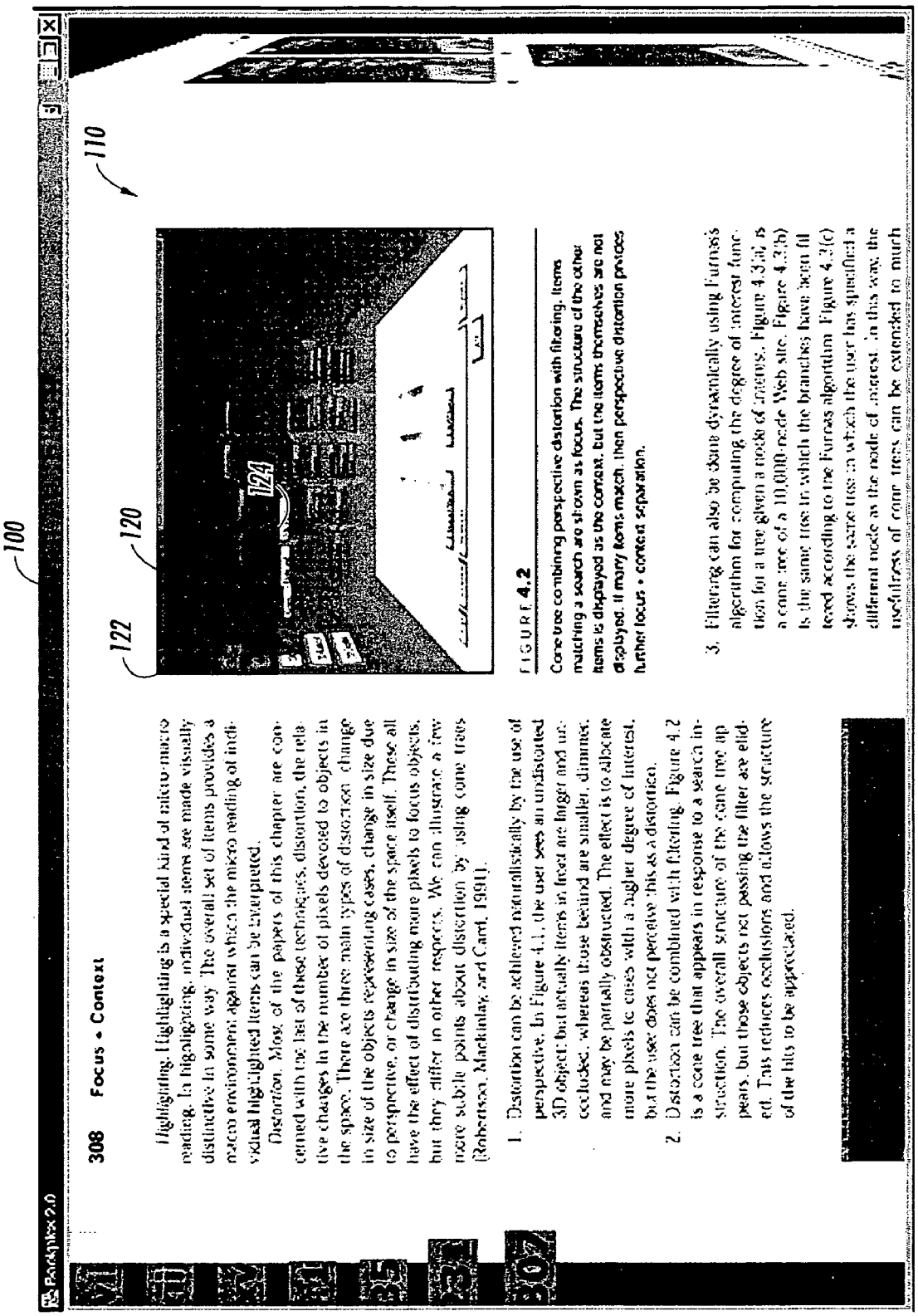
FIG. 1 illustrates one exemplary embodiment of an annotated page of a three-dimensional electronic document using one exemplary embodiment of an electronic annotation tool to define an annotation area.

FIG. 1 illustrates a close-up view of one exemplary embodiment of a three-dimensional electronic book 100 annotated with a highlighter annotation tool (not shown) that marks a rectangular page area 120 of a document page 110, with a certain highlight color. As shown in FIG. 1, a user selects a figure to be highlighted.

Figure 4:
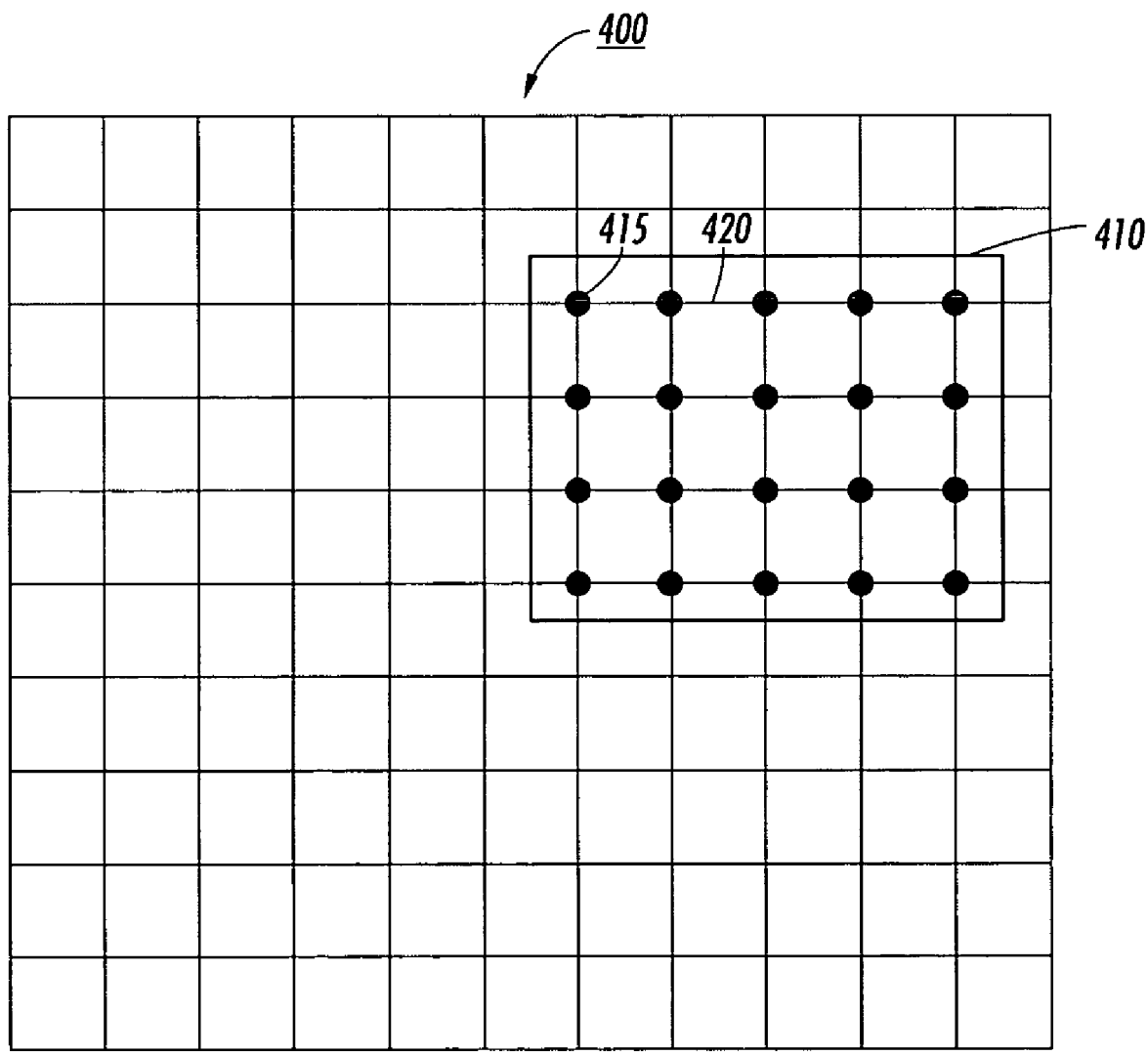
FIG. 4 is a schematic illustration of yet another exemplary embodiment of an annotated page of a three-dimensional electronic document displaying an annotation area with another exemplary embodiment of a displaying technique.

In operation, as the user reads through the book 100, the user may choose to mark a portion of the document page 110, i.e. FIG. 4.2 of page 308, with a highlighter. The portion to be highlighted is defined as a rectangular page area based on the user input. Further, the rectangular page area 120 is highlighted in a specified color. For example, to mark the rectangular page area 120 of the document page 110, the user may press a mouse button to anchor a corner of the rectangle as a starting position 122. As the user drags the mouse, the size of the rectangular area 120 changes and the highlight area is updated dynamically to provide a visual feedback to the user. When the user releases the mouse button to anchor the other corner of the rectangular page area at an end position 124, the user finalizes the highlighted rectangular page area.

The mouse action (i.e., the mouse press action, the mouse drag action, or the mouse release action) indicates where the mouse action occurred on the display screen. In order to find out where on the three-dimensional document page the user pointed at when the mouse action occurred, the screen coordinates of the mouse must be mapped to the local coordinate system of the page. In other words, the rectangular area specified by the user on the screen needs to be transformed from the screen coordinate system to the local coordinate system of the page. If necessary, the rectangular area is further transformed from the local coordinate system of the page to the texture coordinate system of the page. The resulting area is then stored as part of the highlight data.

Raycasting is one example of a technique that facilitates this mapping. The raycasting technique includes shooting a ray from a virtual static camera through the screen position of the mouse $(x_m, y_m)$ towards the three-dimensional document. Next, the intersection point $(x_w, y_w, z_w)$ between the ray and the page of the three-dimensional document is calculated. Assuming that the intersection point is represented in the world coordinate system of the three-dimensional document, this point is then mapped from the world coordinate system of the document to the local coordinate system of the page. If necessary, the point represented in the local coordinate system of the page is further mapped to the texture coordinate system of the page.

It should be appreciated that the highlighting specification technique described above may be applied to documents pages facing straight to the user and/or facing to the user at oblique angles. It should be appreciated that the highlighting specification technique described above may be applied to document pages represented as flat three-dimensional surfaces and/or curved three-dimensional surfaces. It should be appreciated that the highlighting specification technique described above may include other features that can also be implemented as part of the highlighting specification technique. It should also be appreciated that, although the previous description focused on a rectangular area to be highlighted, any polygonal area other than a rectangular area can be specified by the user in a similar manner as discussed above. Further, it should be appreciated that, rather than a mouse, other input devices (e.g., a stylus) can also be employed to specify the page area to be highlighted.

It should also be appreciated that factors other than the location of the annotation area of the highlight may be used to influence the highlighting effect. For example, since viewing the original contents of the page that are located in the marked page areas is desirable, the color of the highlighter and the ink density of the highlighter may be used. In other words, the original contents of the page that are located in the marked page area may be blended with the highlighter color to produce the highlighting effect. In general, the ink density of the highlighter determines how much of the highlighter color appears in the blending result. The denser the highlighter ink is, the more the highlighter color shows in the blending result. To modify both the color and/or the ink density of the highlighter, a user interface (not shown) can be provided that allows the user to change the color and ink density of the highlighter.

It should be appreciated that, as the highlight is created, highlight data pertaining to the highlighted area including the polygon area boundary, the color, the ink density and/or the like is stored in the system for annotating three-dimensional documents and correlated with the corresponding page. The system for annotating three-dimensional documents uses the highlight data to display the highlight on the page as the highlighted area is gradually defined. Additionally, whenever the page is revisited, i.e. due to backward and forward page turning, the highlight is recreated from the stored highlight data and displayed on the corresponding page.

The following detailed description of the method for annotating pages of three-dimensional books discloses several exemplary embodiments of the method of displaying the highlights.

Figure 2:
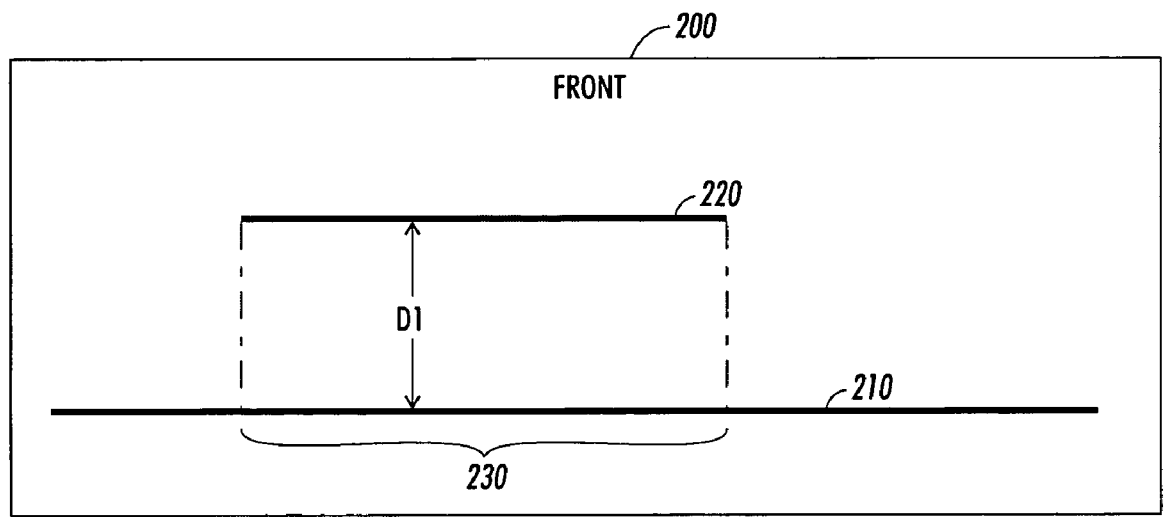
FIG. 2 is a schematic illustration of yet another exemplary embodiment of an annotated page of a three-dimensional electronic document displaying an annotation area with one exemplary embodiment of a displaying technique.

FIG. 2 illustrates one exemplary embodiment of the step of displaying highlights 200 by introducing a transparent, i.e. translucent, polygon 220 and superimposing the transparent polygon 220 over the page area 230, of a three-dimensional page 210, that is to be highlighted. The location and size of the transparent polygon 220 is equal to the location and size of the page area 230, which is determined by the stored highlight data. However, superimposing the transparent polygon 220 over the page area 230 that is to be highlighted creates a Z fighting problem.

The problem of Z fighting arises when two overlapping, co-planar polygons P1 and P2 are displayed. Due to the quantization of the Z buffer in the graphics hardware, after scan conversion P1 may have some pixels in front of P2 and other pixels behind P2. As a result, there is no clear separation between P1 and P2. In other words, when the user looks at the page from the front side of the page, part of the transparent polygon 220 may be in front of the page area 230 and part of the transparent polygon 220 may be behind the page area 230 (i.e., being blocked by the page area 230). To avoid the Z fighting problem, the transparent polygon 220 is slightly elevated from the page 210 towards the front side of the page by a certain distance D1. The minimal offset distance depends on the Z buffer of the graphics hardware. In addition, the color of the polygon 220 reflects the color of the highlighter, and the opacity of the polygon 220 models the ink density of the highlighter.

Figure 3:
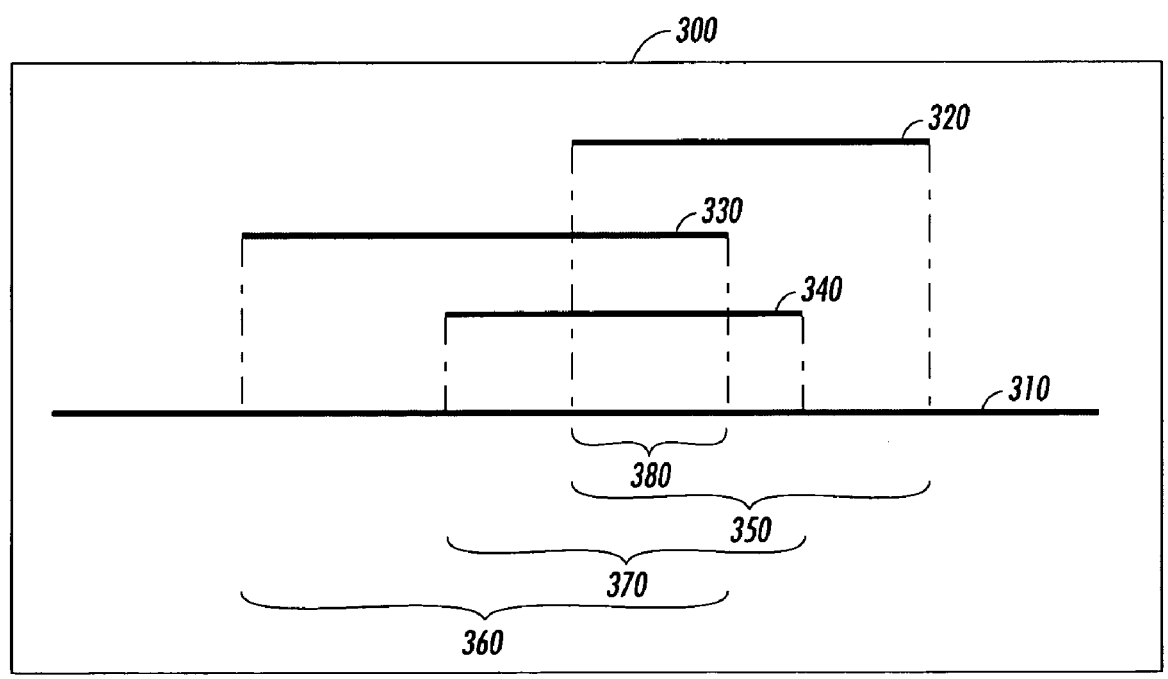
FIG. 3 is a schematic illustration of yet another exemplary embodiment of an annotated page of a three-dimensional electronic document displaying three annotation areas with another exemplary embodiment of the displaying technique of FIG. 2.

FIG. 3 illustrates one exemplary embodiment of the step of displaying highlights 300 by introducing multiple transparent polygons 320, 330, 340 and superimposing the transparent polygons 320, 330, 340 over three page areas 350, 360, 370, of a three-dimensional page 310, that are to be highlighted. When multiple transparent polygons 320, 330, 340 overlap a common area 380 of the three-dimensional page 310, the transparent polygons 320, 330, 340 are offset from each other to avoid the Z fighting problem. As a result, as more and more highlights are created and possibly removed, figuring out how to offset each newly created polygon becomes increasingly difficult.

FIG. 4 illustrates another exemplary embodiment of the step of displaying highlights on a page 400 by introducing vertex coloring to color those vertices within the three-dimensional page area 410 that is to be highlighted. The vertex coloring technique also includes an additional step in the specification stage described previously. Specifically, after determining the boundary of the polygon area 410 on the page in the specification stage, the polygonal area 410 is additionally transformed from the local coordinate system of the page to the texture coordinate system of the page and the result is stored as part of the highlight data. As illustrated in FIG. 4, the polygonal boundary specified by the user determines the page area 410 that needs to be highlighted.

As shown in FIG. 4, the page geometry is represented as a polygon mesh which is a computer graphics technique which uses vertices 415 and edges 420 connecting those vertices 415 to approximate the shape of a three-dimensional object, i.e. the three-dimensional page. Each vertex 415 of the page has a texture coordinate in the texture coordinate system of the page so the vertices 415 lying inside the user-specified polygonal area 410 can be identified. Once the vertices 415 are identified, the colors of the identified vertices 415 are re-evaluated as a function of the highlighter color and the ink density. By using texture mapping, the colors of the vertices (both inside and outside the polygonal area 410) of the polygon mesh are bi-linearly interpolated and then blended with the page texture to produce a high-lighting effect.

Although the vertex coloring technique can easily accommodate curved surfaces, the vertex coloring technique produces noticeable artifacts. These artifacts are a result of the bi-linear interpolation of vertex colors that occur in the scan conversion of the polygon mesh. Although using a finer polygon mesh will, to a certain degree, ameliorate the highlight boundary, an additional drawback is created because more vertices will need to be processed.

Figure 5:
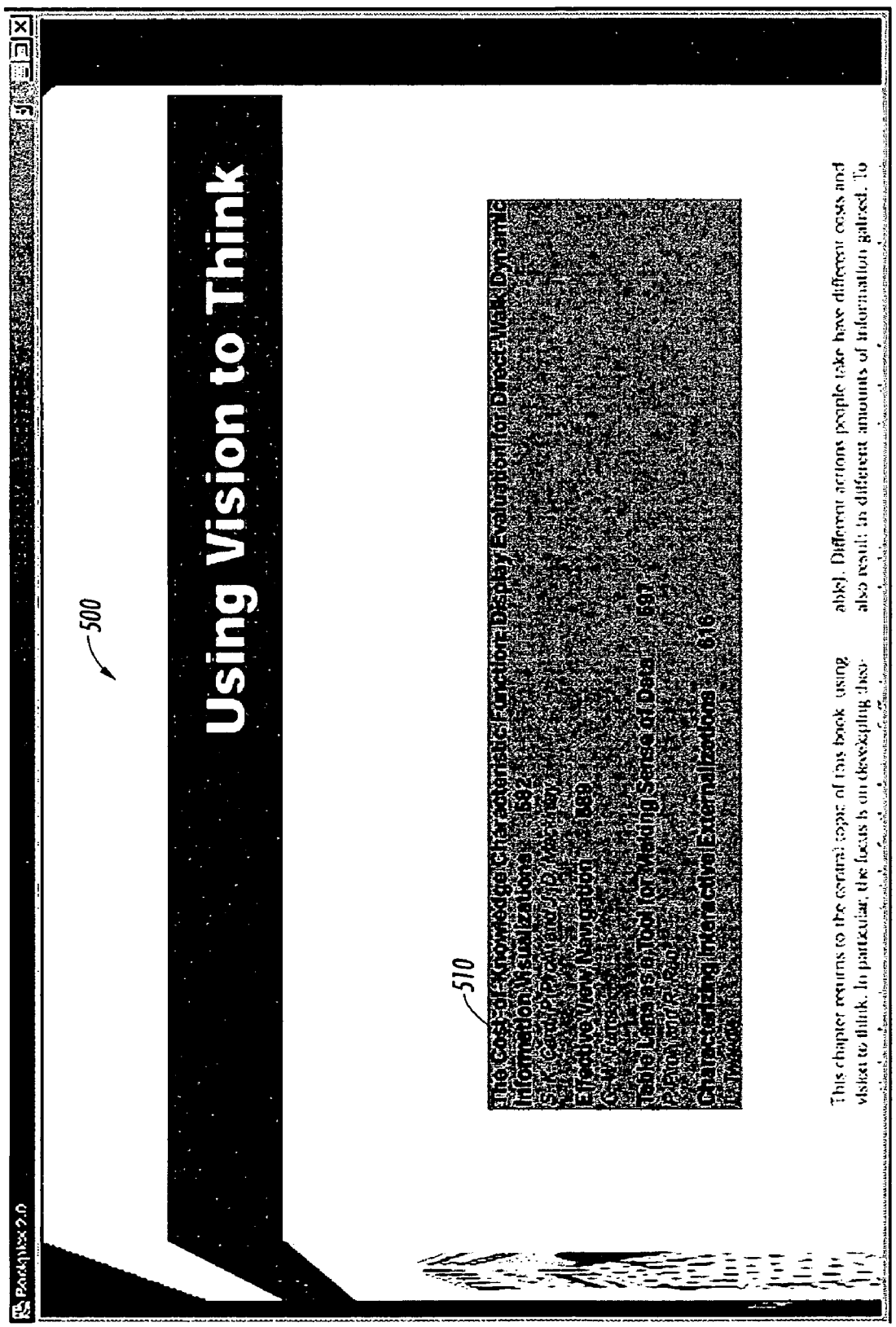
FIG. 5 illustrates yet another exemplary embodiment of an annotated page of a three-dimensional electronic document displaying an annotation area with yet another exemplary embodiment of a displaying technique.

FIG. 5 illustrates yet another exemplary embodiment of the step of displaying highlights by introducing texture coloring to modify the texture pasted on the page geometry 500. The texture coloring technique also includes an additional step in the specification stage. Specifically, after determining the boundary of the polygon area on the page in the specification stage, the polygonal area 510 is additionally transformed from the local coordinate system of the page to the texture coordinate system of the page and the result is stored as part of the highlight data.

As illustrated in the preferred embodiment of FIG. 5, to achieve the highlighting effect, a blending operation is performed. Thus, for each identified texture pixel within the highlighted polygonal area 510, the color of the texture pixel is computed. The color of the texture pixel is determined by satisfying the following relationship: $C_t=(1.0-\text{density})*C_t+\text{density}*C_h$, where $C_t$ is the color of the pixel, $C_h$ is the color of the highlighter, and density is the ink density of the highlighter normalized to be in the range of 0.0 to 1.0. This blending operation produces a new texture for the page geometry 500.

The blending operation is performed on the fly to create a new texture when necessary, e.g. when the page becomes newly visible due to page turning. However, the blending operation could potentially be a bottleneck depending on the number of pixels that must be processed. Since the blending operation could potentially be time consuming and expensive, the multi-resolution page textures used in other three-dimension document features such as page turning can be used. The page turning feature is described in U.S. patent application 10/739175 herein incorporated by reference.

For example, when user responsiveness is desired, e.g. to generate the first frame of a page turning animation or to display the highlight as the polygonal page boundary is being specified, the blending operation is performed on a low-resolution texture of the page. This significantly reduces the overhead of the blending operation because the number of pixels to be processed is reduced from the number of pixels in a high-resolution texture. When the display quality becomes important, e.g. at the end of a page turning animation or at the end of specifying the boundary of the polygonal area, a higher resolution texture of the page is used.

As shown in FIG. 5, the texture coloring technique produces well-defined boundaries for the highlighted areas. In order to preserve text quality, the page texture generally has a much higher resolution than the polygon mesh of the page geometry. Therefore, the result of the bi-linearly interpolated texture coordinates is visually more appealing than the result of the bi-linearly interpolated vertex colors.

In the previously described exemplary embodiments of the highlighting display techniques, the page texture is not directly modified when the user specifies a highlight. Since the page texture may be public data that may be shared by multiple users, the page texture is not directly modified in order to preserve the original content of the page. However, annotations such as highlights are private data created by one user. By preserving the original page texture, highlights may be easily removed when necessary. Thus, the highlight data is stored separately from the corresponding page texture to allow flexibility to access to the un-annotated three-dimensional document, the annotations alone or the annotated three-dimensional document.

Figure 6:
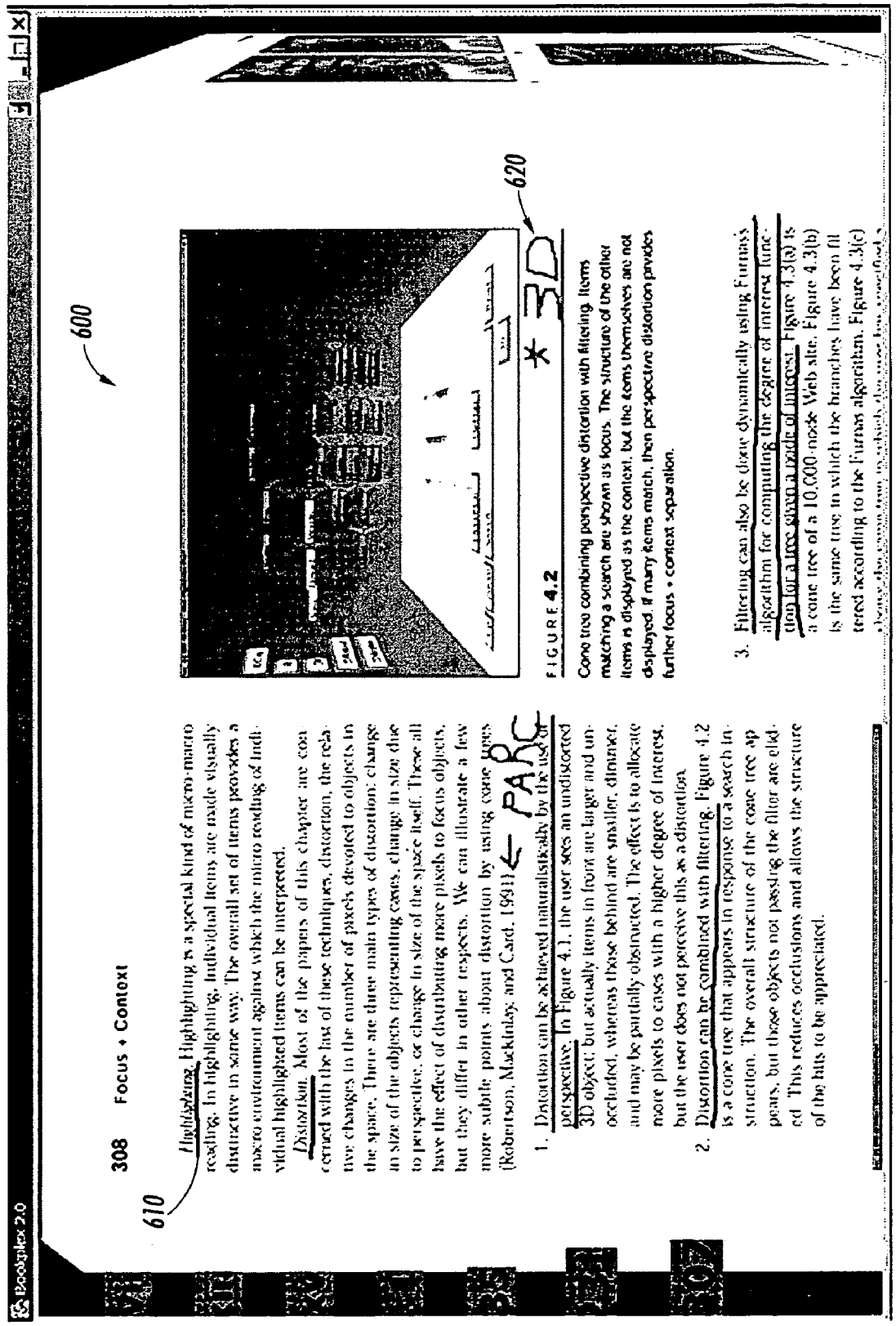
FIG. 6 illustrates one exemplary embodiment of an annotated page of a three-dimensional electronic document using another exemplary embodiment of an electronic annotation tool.

FIG. 6 illustrates another exemplary embodiment of the method for annotating three-dimensional documents. As illustrated in FIG. 6, pen-based annotations 610,620, i.e. annotations with a stylus, may be used as a method for annotating three-dimensional documents to allow the user to sketch out free-form annotations. This can be accomplished by modifying the specification stage and display stage of the annotation operation described above.

For example, handwritten annotations 610,620 can be decomposed and approximated with a set of strokes where each stroke has a trajectory, width, color, and ink density. The trajectory of a stroke is captured as the user annotates the page 600 by sliding the stylus (not shown) from one location of the three-dimensional page 600 to the next location of the three-dimensional page 600. The width, color, and ink density of a stroke can be modified by the user with a user interface (not shown). The stroke trajectory, coupled with stroke width, generally defines the footprint of the stroke on the display screen. This footprint can be approximately represented as a polygon.

After the specification stage discussed previously, the polygon is transformed from the screen coordinate system to the local coordinate system of the three-dimensional page 600. If necessary, the polygon is further transformed from the local coordinate system of the page 600 to the texture coordinate system of the page 600. The annotation data, i.e. the polygon boundary, the color, and the ink density, is then stored and correlated with the respective page. Although the handwritten annotation can be displayed using any of the display techniques previously discussed, the texture coloring technique is the preferred display technique.

It should be appreciated that the previously described annotation operation may be modified to support other types of annotations for three-dimensional documents. For example, at the specification stage, by using a mouse or a stylus the user can indicate where on the three-dimensional page to place a text annotation. This location is transformed from the screen coordinate system to the texture coordinate system of the page. Then, by using a keyboard, the user can input the content of the text annotation. Alternatively, the content of the text annotation can be specified in a handwritten manner using the stylus and subsequently OCRed to yield the printed version. At the display stage, the content of the text annotation can be rendered as an ink layer and blended with the original page texture to create a new texture, which is pasted on the page geometry. The resulting effect is that we have a transparent or opaque text annotation being shown on top of the original content of the three-dimensional page.

Figure 7:
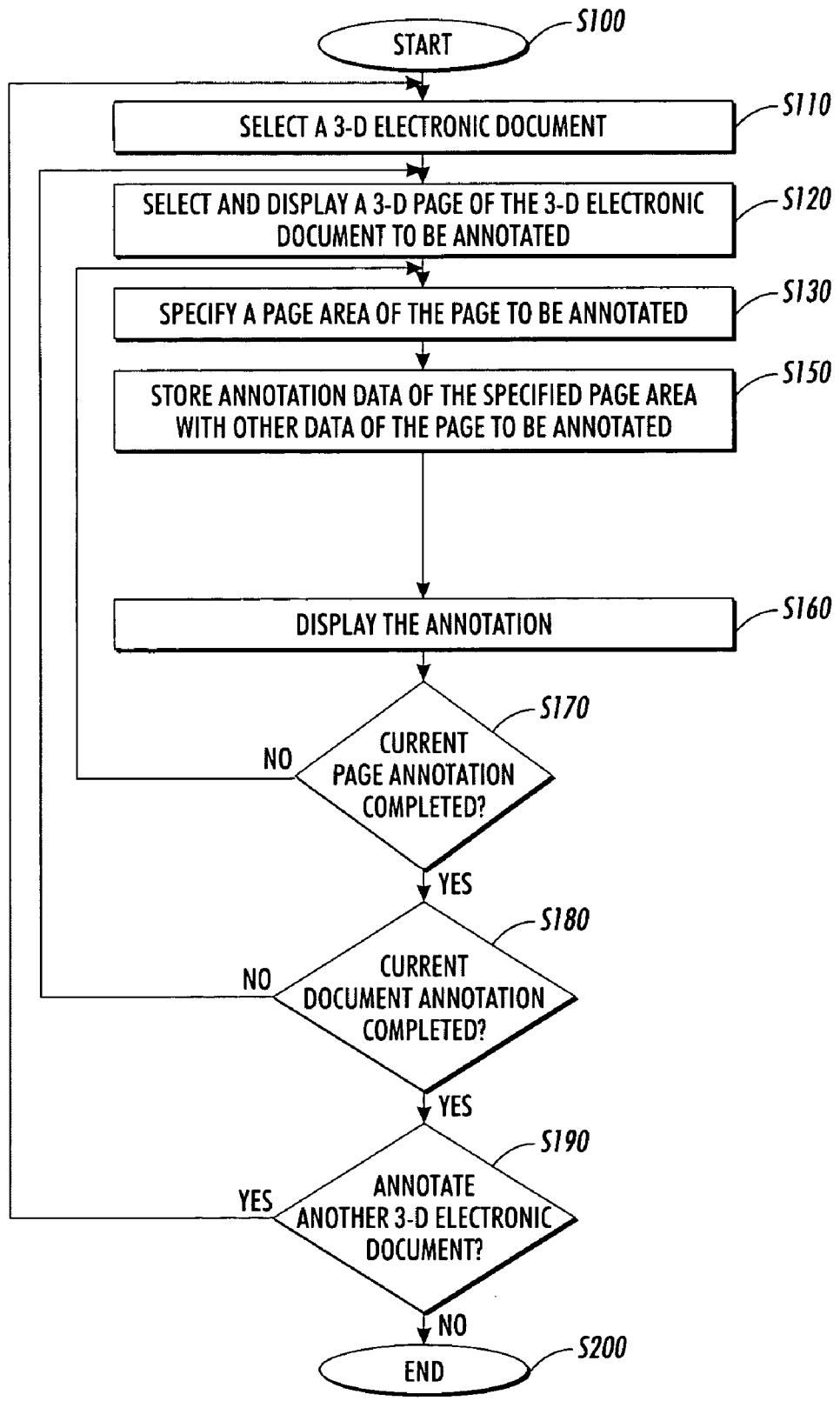
FIG. 7 is a flowchart outlining in greater detail one exemplary embodiment of the method for annotating pages of three-dimensional electronic documents.

FIG. 7 is a flow chart outlining one exemplary embodiment of the method for annotating three-dimensional documents. As shown in FIG. 7, operation of the method begins in step S100, and continues to step S110, where a three-dimensional document is selected. Then, in step S120, a page of a three-dimensional document to be annotated is turned to and displayed. It should be appreciated that a user may use a drop-down menu or a mouse button to select a page to be turned to. Next, in step S130, a page area of the three-dimensional page to be annotated is specified. Operation then continues to step S150.

In step S150, the annotation data, e.g. the polygon boundary, the color, and the ink density, relating to the specified page area is stored and correlated with other data (e.g., textures) of the page to be annotated. Then, in step S160, the annotation is displayed. Next, in step S170, it is determined whether the annotation of the current page is completed. If so, operation continues to step S180. If not, operation returns to step S130.

In step S180, it is determined whether the annotation of the current document is completed. If so, operation continues to step S190. If not, operation returns to step S120.

In step S190, it is determined whether another three-dimensional electronic document is to be annotated. If so, operation returns to step S110. If not, operation continues to step S200, where operation of the method ends.

It should be appreciated that annotation is not necessarily performed as a single activity. More likely, annotations are added as the user is reading through a document. For example, the user reads a page and finds a few interesting sentences on the page. The user then marks the sentences with an annotation tool, i.e. a highlighter, and then continues to read through the document. In other words, the user can perform other activities between annotations such as reading, turning pages and/or the like.

Figure 8:
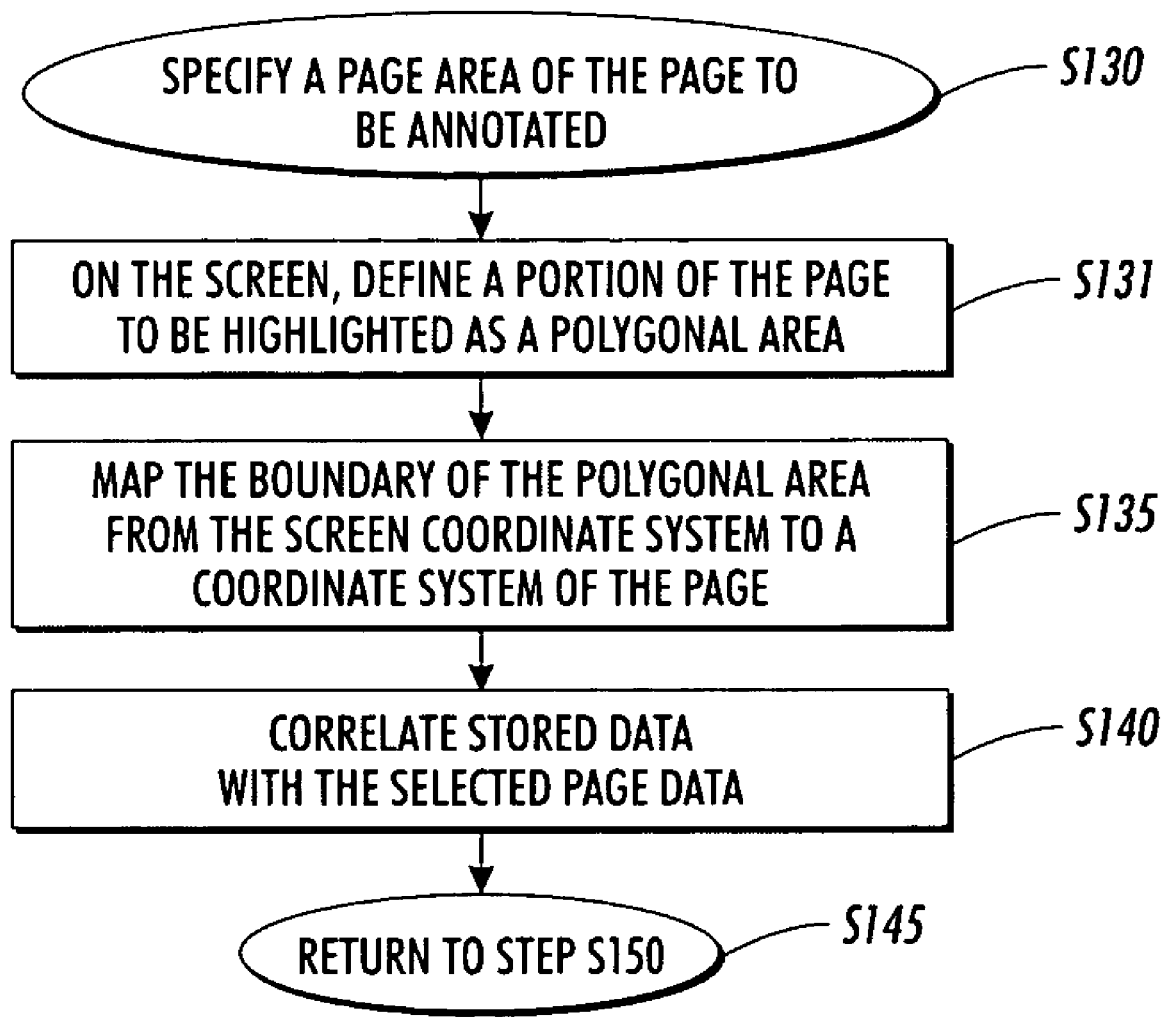
FIG. 8 is a flowchart outlining in greater detail one exemplary embodiment of the method for specifying a page area of the three-dimensional electronic document to be annotated.

FIG. 8 is a flow chart outlining in greater detail one exemplary embodiment of the method for specifying a page area of three-dimensional document to be annotated. As shown in FIG. 8, operation of the method begins in step S130, and continues to step S131, where based on the user input a portion of the page to be highlighted is defined as a polygonal area on the screen. Then, in step S135, the boundary of the polygonal area is mapped from the screen coordinate system to a coordinate system of the page. Next, in step S140, the stored data is correlated with the selected page data. Operation then continues to step S145, where operation of the method returns to step S150.

It should be appreciated that the user may modify the highlighter color and/or the ink density if desired. For example, if the user wants to modify the highlighter color, the user may select the color from a drop-down menu. Then, color of the highlighter is modified and new color data is stored. If the user wants to modify the ink density, the user may select the ink density from a drop-down menu. Then, the ink density of the highlighter is modified and new ink density data is stored. Therefore, the user interface to modify the color and ink density only appears when explicitly requested by the user.

Figure 9:
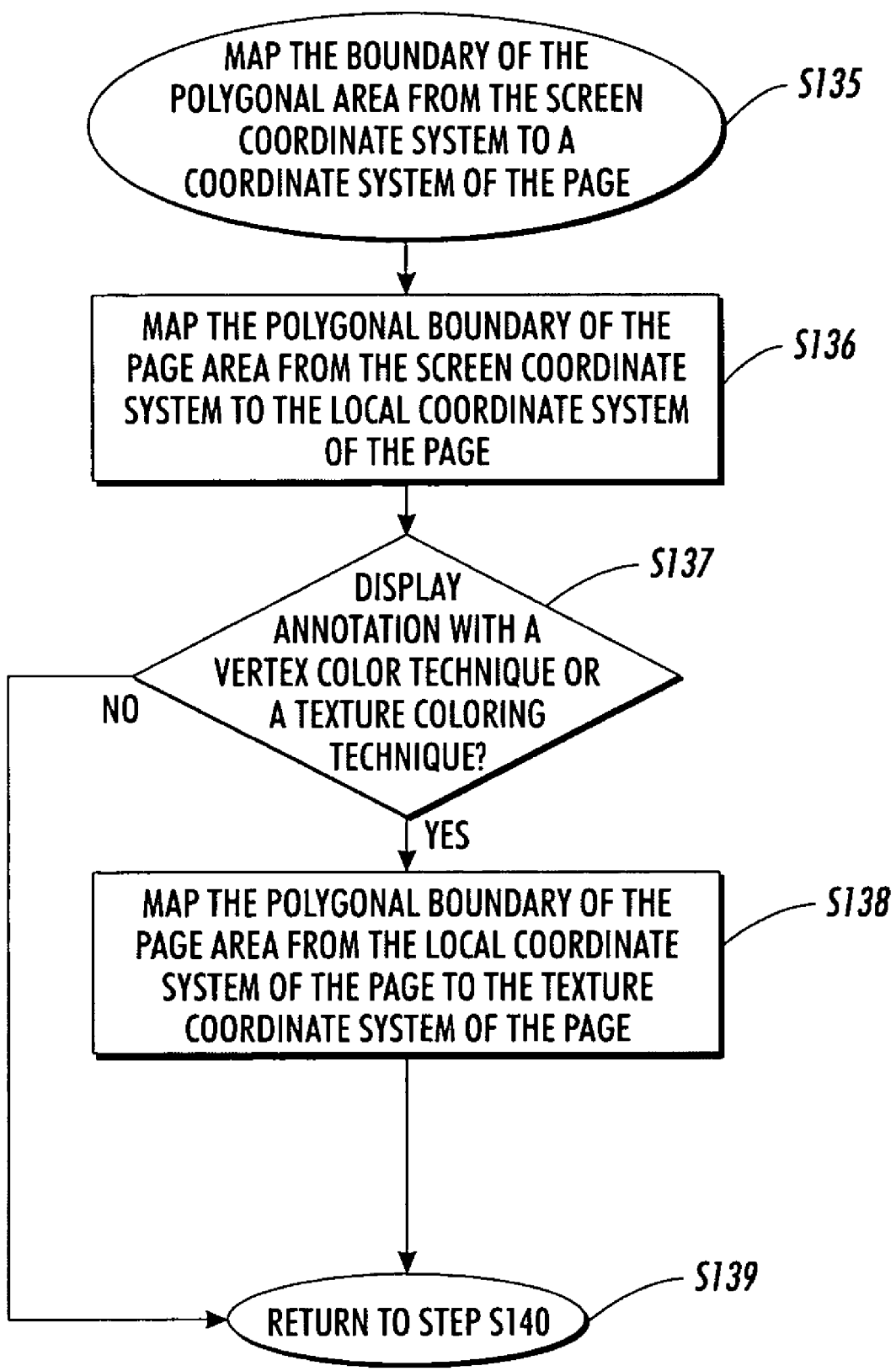
FIG. 9 is a flowchart outlining in greater detail one exemplary embodiment of the method for mapping the polygon boundary of the page area from the screen coordinate system to the local coordinate system of the page (and if necessary, to the texture coordinate system of the page)

FIG. 9 is a flow chart outlining in greater detail one exemplary embodiment of the method for mapping the polygonal boundary of the page area from the screen coordinate system to a coordinate system of the page. As shown in FIG. 9, operation of the method begins in step S135 and continues to step S136, where the polygonal boundary of the page area is mapped from the screen coordinate system to the local coordinate system of the page. Operation then continues to step S137.

In step S137, it is determined whether the annotation is to be displayed using a vertex coloring technique or a texture coloring technique. If so, operation continues to step S138, where the polygonal boundary of the page area is further mapped from the local coordinate system of the page to the texture coordinate system of the page. If not, operation jumps to step S139, where operation of the method returns to step S140.

Figure 10:
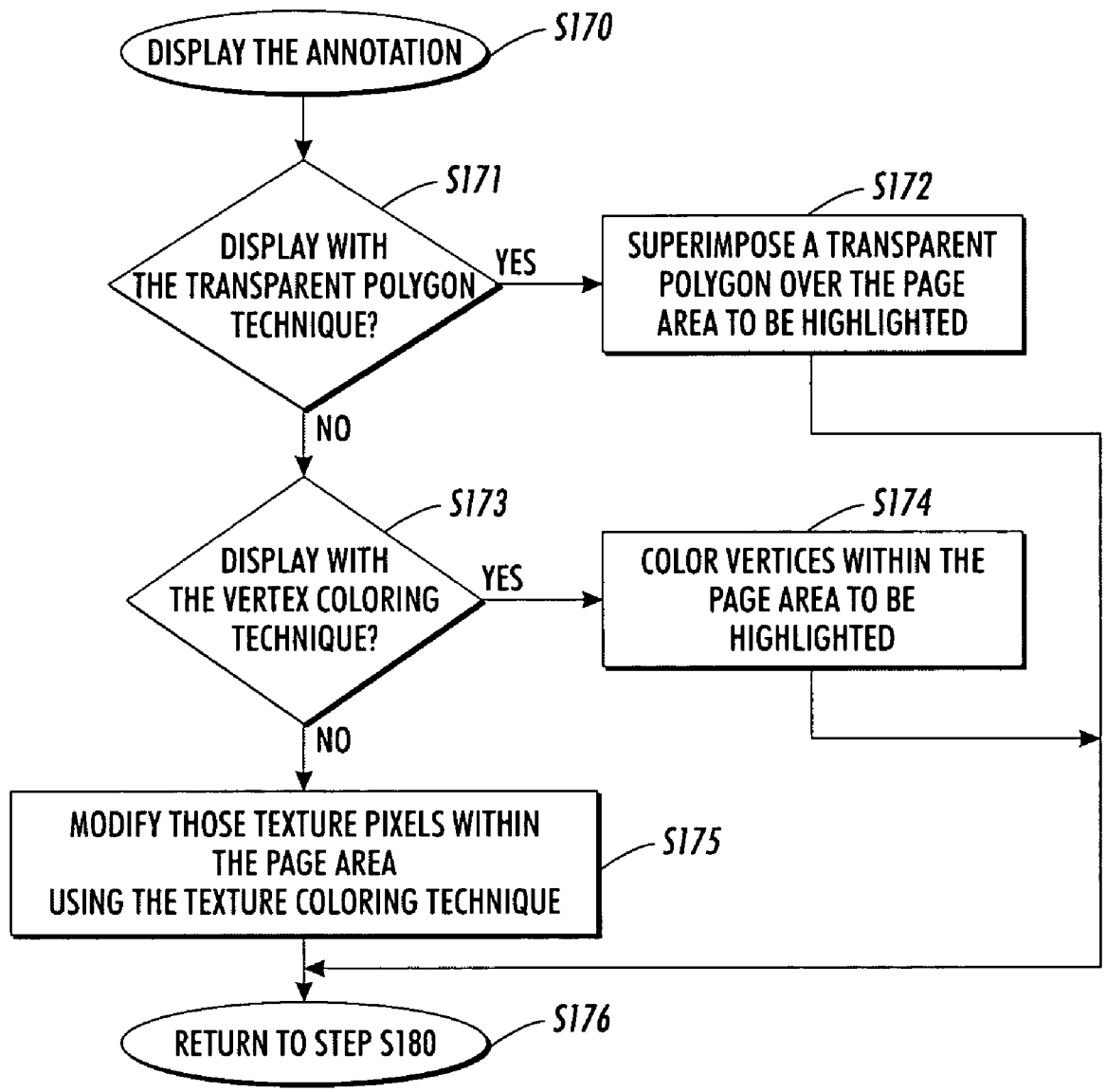
FIG. 10 is a flowchart outlining in greater detail one exemplary embodiment of the method for displaying the annotations in the page areas of three-dimensional electronic document to be annotated.

FIG. 10 is a flow chart outlining in greater detail one exemplary embodiment of the method for displaying an annotation. As shown in FIG. 10, operation of the method begins in step S170, and continues to step S171, where it is determined whether the annotation is to be displayed with a transparent polygon technique. If so, operation continues to step S172. Otherwise, operation jumps to step S173.

In step S172, a transparent polygon is superimposed over the page area to be highlighted. Operation then jumps to step S176. In contrast, in step S173, it is determined whether the annotation is to be displayed with a vertex coloring technique. If so, operation continues to step S174. Otherwise, operation jumps to step S175.

In step S174, all vertices within the page area to be highlighted are colored. Operation then jumps to step S176. In contrast, in step S175, those texture pixels within the page area to be highlighted are modified using the texture coloring technique. Operation then continues to step S176, where operation of the method returns to step S180.

Figure 11:
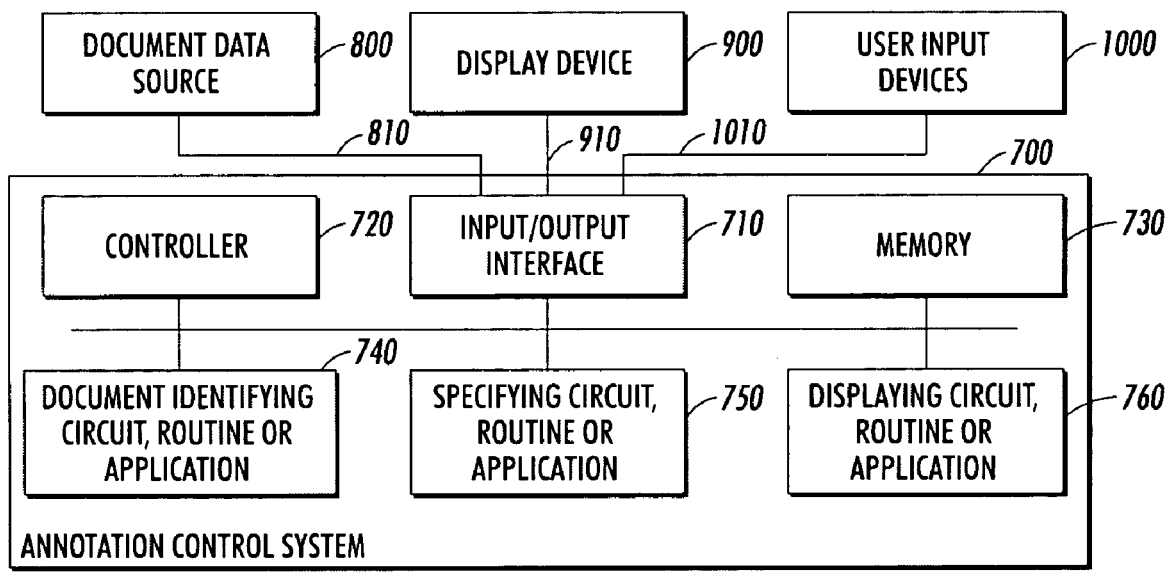
FIG. 11 is a block diagram outlining one exemplary embodiment of a system for annotating pages of three-dimensional electronic documents according to this invention.

FIG. 11 is a functional block diagram outlining one exemplary embodiment of an annotation control system 700 according to this invention. As shown in FIG. 11, the annotation control system 700 includes an input/output interface 710, a controller 720, a memory 730, a document identifying circuit, routine or application 740, a page area specifying circuit, routine or application 750, and an annotation displaying circuit, routine or application 760, each appropriately interconnected by one or more control and/or data buses. The input/output interface 710 is linked to the document data source 800 by a link 810, and the display device 900 by a link 910. Further, the input/output interface 710 is linked to one or more user input devices 1000 by one or more links 1010.

Each of the links 810, 910 and 1010 can be any known or later-developed connection system or structure usable to connect their respective devices to the annotation control system 700. It should also be understood that links 810, 910 and 1010 do not need to be of the same type.

The memory 730 can be implemented using any appropriate combination of alterable, volatile or non-volatile memory or non-alterable, or fixed, memory. The alterable memory, whether volatile or non-volatile, can be implemented by using any one or more of static or dynamic RAM, a floppy disk and disk drive, a writable or rewritable optical disk and disk drive, a hard drive, flash memory or the like. Similarly, the non-alterable or fixed memory can be implemented using any one or more of ROM, PROM, EPROM, EEPROM, and gaps in optical ROM disk, such as a CD ROM or DVD ROM disk and disk drive, or the like.

The input/output interface 710 is connected to the user input devices 1000 over a link 1010. The user input devices 1000 can be one or more of a touch pad, a touch screen, a track ball, a mouse, a keyboard, a stylus or any known or later-developed user input devices 1000 for inputting data and/or control signals to the annotation control system for annotating pages of the three-dimensional electronic document.

Furthermore, the input/output interface 710 is connected to display device 900 over link 910. In general, the display device 900 can be any device that is capable of outputting a rendered image of the three-dimensional electronic document according to the method and the annotation control system 700 of the exemplary embodiments.

The document identifying circuit, routine or application 740 inputs a user input, inputs a three-dimensional electronic document to be annotated and identifies the three-dimensional document page to be annotated. Then, the page area specifying circuit, routine or application 750 inputs a user input, inputs the three-dimensional electronic document, inputs the identified three-dimension page to be annotated and specifies a portion of the page as the page area to be annotated. Finally, the annotation displaying circuit, routine or application 760 inputs the three-dimensional electronic document, inputs the identified three-dimension page to be annotated, inputs the specified page area to be annotated, and displays the annotated page using an annotation display technique.

The exemplary embodiment of an annotation control system 700 for annotating pages of a three-dimensional electronic document according to FIG. 11 operates in the following manner.

In operation, a user input is output from the user input devices 1000 over link 1010 to the input/output data interface 710 of the annotation control system 700. The user input includes information regarding the source of the three-dimensional electronic documents to be annotated. The user input information is then stored in the memory 730 under control of the controller 720. Next, the three-dimensional documents is output from the document data source 800 over link 810 to the input/output interface 710 in accordance with the user input. The three-dimensional electronic document is then input into the document identifying circuit, routine or application 740 under the control of the controller 720.

The document identifying circuit, routine or application 740 identifies the three-dimensional electronic document to be annotated based on user input and the controller stores the identified three-dimensional electronic document in the memory 730.

The page area specifying circuit, routine or application 750 allows the user to specify a portion of the three-dimensional document as a polygonal page area to be annotated on the display device 900. Additionally, the page area specifying circuit, routine or application 750 maps the polygonal boundary of the page area from the screen coordinate system to the local coordinate system of the page. The page area specifying circuit, routine or application 750 also maps the polygonal boundary of the page area from the local coordinate system of the page to the texture coordinate system of the page when the vertex coloring or texture coloring display techniques is used to display the annotation. Further, the page area specifying circuit, routine or application 750 may modify highlighter color or ink density of the highlighter based on user input. Finally, the page area specifying circuit, routine or application 750 stores the annotation data in memory 730 and correlates the annotation data with other data of the page via the controller 720.

The annotation displaying circuit, routine or application 760 displays the annotation in the specified polygonal page area according to one of the exemplary embodiments of display techniques selected by the user. Then, the annotation displaying circuit, routine or application 760 either superimposes a transparent polygon over the page area to be annotated, colors vertices within the page area to be annotated or modifies texture pixels within the page area to be annotated based on the selected display technique.

In the exemplary embodiments of the systems and methods for annotating three-dimensional electronic documents, it should be appreciated that the systems and methods can be applied to a flat page surface and/or a curved page surface. However, when the systems and methods are applied to a curved page surface, the annotation is also required to deform along with the page area to be annotated. It should also be appreciated that the portion of the page to be annotated can be defined as a page area having a non-polygonal boundary.

While this invention has been described in conjunction with the exemplary embodiments outlined above, it is evidenced that many alternative, modifications and variations will be apparent to those skilled in the art. Accordingly, the exemplary embodiments of the invention, as set forth above, are intended to be illustrative, not limiting. Various changes may be made without departing form the spirit and scope of the invention.

What is claimed is:

1. A method for annotating a three-dimensional electronic document, comprising:

selecting a page of the three-dimensional electronic document to be annotated, the page of the three-dimensional document including a three-coordinate local coordinate system;

providing an annotation tool having a color and an ink density to annotate the selected page;

specifying an area on a two-dimensional screen including a two-coordinate screen coordinate system by a user, the specified area corresponding to a page area of the page to be annotated by the user using an annotation tool;

transforming coordinates of the specified area from the two-coordinate screen coordinate system of the screen to the three-coordinate local coordinate system of the page; and displaying annotation data corresponding to the specified area, wherein the annotation data of the specified area is stored and correlated with other data of the selected page.

2. The method of claim 1, wherein specifying the area of the page to be annotated includes:

determining coordinates of the specified area on the two-dimensional screen in the two-coordinate screen coordinate system; and mapping the coordinates of the specified area from the two-coordinate screen coordinate system to the three-coordinate local coordinate system of the page.

3. The method of claim 1, wherein specifying the area of the page to be annotated includes mapping the coordinates of the specified area from the three-coordinate local coordinate system of the page to a texture coordinate system of the page.

4. The method of claim 3, wherein displaying the annotation data includes displaying the annotation data with a vertex coloring technique.

5. The method of claim 4, wherein displaying the annotation data with the vertex coloring technique includes representing a geometry of the page as a polygon mesh having vertices and edges connecting the vertices, and each of the vertices includes a texture coordinate in the texture coordinate system of the page.

6. The method of claim 5, wherein displaying the annotation data with the vertex coloring technique includes coloring the vertices within the specified area to be annotated.

7. The method of claim 3, wherein displaying the annotation data includes displaying the annotation data with a texture coloring technique.

8. The method of claim 7, wherein displaying the annotation data with the texture coloring technique includes representing a geometry of the page as a polygon mesh having vertices and edges connecting the vertices, and each of the vertices includes a texture coordinate in the texture coordinate system of the page.

9. The method of claim 8, wherein displaying the annotation data with the texture coloring technique includes modifying the color of the texture pixels in the specified area to be annotated.

10. The method of claim 9, wherein modifying the texture pixels within the specified area to be annotated includes blending a color of the texture pixel and a color of the annotation tool.

11. The method of claim 1, wherein providing the annotation tool includes supporting a free-form annotation.

12. The method of claim 1, wherein providing the annotation tool includes supporting a text annotation.

13. The method of claim 1, wherein providing the annotation tool includes providing a virtual highlighter having a highlighter color and an ink density to annotate the selected page.

14. The method of claim 1, wherein displaying the annotation data includes displaying the annotation data with a transparent polygon technique.

15. The method of claim 14, wherein displaying the annotation data with the transparent polygon technique includes superimposing a transparent polygon over the specified area to be annotated.

16. A system for annotating a three-dimensional electronic document, comprising:

a document identifying circuit, routine or application that identifies a page of the three-dimensional electronic document to be annotated, the page of the three-dimensional document including a three-coordinate local coordinate system;

a specifying circuit, routine or application that specifies, on an instruction from a user, an area on a two-dimensional screen including a two-coordinate screen coordinate system, the specified area corresponding to a page area of the page to be annotated by the user using an annotation tool and that transforms coordinates of the specified area from the two-coordinate screen coordinate system of the screen to the three-coordinate local coordinate system of the page; and a displaying circuit, routine or application that displays an annotation in the specific area of the page, wherein data of the specified area is stored and correlated with the selected page.

17. A computer-readable medium storing a set of program instructions executable on a data processing device and usable to annotate a three-dimensional electronic document, comprising:

instructions for selecting a page of the three-dimensional electronic document to be annotated, the page of the three-dimensional document including a three-coordinate local coordinate system;

instructions for providing an annotation tool to annotate the selected page;

instructions for specifying an area on a two-dimensional screen including a two-coordinate screen coordinate system by a user, the specified area corresponding to a page area of the page to be annotated by the user using an annotation tool;

instructions for transforming coordinates of the specified area from the two-coordinate screen coordinate system of the screen to the three-coordinate local coordinate system of the page; and instructions for displaying annotation data corresponding to the specified area, wherein the annotation data of the specified area is stored and correlated with other data of the selected page.

* * * * *